United States Patent [19]

Courtenay et al.

[11] 4,240,746

[45] Dec. 23, 1980

[54] SYSTEM FOR TRANSMITTER FREQUENCY CONTROL IN COHERENT LADAR

[75] Inventors: Terence H. Courtenay, Ottawa; James M. Cruickshank, Quebec, both of Canada

[73] Assignee: Her Majesty the Queen in right of Canada, as represented by the Minister of National Defense, Ottawa, Canada

[21] Appl. No.: 64,294

[22] Filed: Aug. 6, 1979

[51] Int. Cl.³ .......................... G01C 3/08; H01S 3/00
[52] U.S. Cl. .................... 356/5; 331/94.5 C; 331/94.5 M; 331/94.5 S
[58] Field of Search .............. 331/94.5 C, 94.5 M, 331/94.5 S; 356/5, 28.5

[56] References Cited

U.S. PATENT DOCUMENTS

| | | | |
|---|---|---|---|
| 3,471,803 | 10/1969 | Forster | 331/94.5 S |
| 3,790,278 | 2/1974 | Buczek et al. | 356/28.5 |
| 3,950,100 | 4/1976 | Keene et al. | 356/28.5 |

Primary Examiner—Stephen C. Buczinski
Attorney, Agent, or Firm—Nathan Edelberg; Edward Goldberg; Michael Zelenka

[57] ABSTRACT

A system for ensuring that the transmitted pulse of a coherent ladar is at the correct frequency for coherent detection of received echoes. A hybrid laser transmitter has its continuous mode signal frequency swept through the stabilized frequency of a local oscillator laser. At the instant when the frequency of the transmitter is at a predetermined difference from the frequency of the local oscillator, a high powered output signal is pulsed in the hybrid laser. The resulting reflected, received signals can be mixed with the continuous local oscillator signal in a crystal mixer to produce pulses at the intermediate frequency for amplification and detection. The effect of random variation in frequency of both the local oscillator and hybrid laser is thus avoided.

12 Claims, 4 Drawing Figures

WAVEFORM DIAGRAM ically equal to that of a local oscillator. The transmitter is comprised of a high power pulsed laser section 1 which is in series with a low power amplifying and continuously oscillating laser section 2, both having a common coaxial optical cavity. Reflecting diffraction grating 3 and partially transmitting mirror 4 form the ends of the cavity. The low powered section 2 has a relatively narrow amplifying bandwidth which is equal to or less than the frequency spacing between the longitudinal modes of the optical cavity. Therefore when the high powered section is pulsed by means of pulser 5, oscillation is built up at some frequency within this bandwidth. An output laser beam 6 passes through the partially transmitting mirror 4 and is aimed at a target. This type of laser is sometimes called a hybrid laser and operates on a Single Longitudinal Mode (SLM) of the cavity.

SYSTEM FOR TRANSMITTER FREQUENCY CONTROL IN COHERENT LADAR

BACKGROUND OF THE INVENTION

1. FIELD OF THE INVENTION

This invention relates to a laser radar (or ladar) system having improved transmitter frequency stability.

2. DESCRIPTION OF THE PRIOR ART

Laser radar systems using the homodyne or heterodyne form of signal detection for improved sensitivity generally utilize a main pulse laser which hits a target and is reflected. The reflected signal is received and is mixed with the laser beam of a local oscillator laser in a crystal detector. The transmitting laser must operate at an optical frequency exactly equal to that of the local oscillator (LO) for homodyne detection or different from it by a fixed intermediate frequency (IF) for heterodyne detection.

In a continuous wave laser radar, stability is often achieved by mixing a portion of the transmitted output signal with a portion of the local oscillator output signal to obtain a difference frequency signal. This signal is compared with the required intermediate frequency and any difference is used to control the frequency of the local oscillator or of the transmitter by a servomechanism which acts, by example, to change the length of the optical cavity until the difference frequency is equal to the intermediate frequency.

However, where a pulsed laser is used as the transmitter (for determination of target range), it is extremely difficult to cause it to oscillate at exactly the same frequency on each pulse even if the transmitter laser is forced to oscillate on a single longitudinal mode of its optical cavity. This difficulty exists because changes in the refractive index of the lasing medium, mechanical shock when the laser pulses an output signal, and vibrations of the apparatus imparted by the environment act to alter the effective length of the optical cavity, and therefore its resonant frequency.

Thus it has been virtually impossible to ensure that successive transmitter pulses will always be at the same frequency difference from the local oscillator, which itself may not be completely stable in frequency.

SUMMARY OF THE INVENTION

It is therefore the primary object of the present invention to provide a pulsed laser radar in which the frequency of the output laser beam is always at a fixed frequency difference from the local oscillator frequency such that the mixed frequency is at a predetermined intermediate frequency for echoes from a fixed target and differ from the IF by the Doppler frequency for a moving target.

This is accomplished in the present invention by taking special steps to pulse the transmitter laser at the precise time that the transmitter frequency and the local oscillator frequency differ by a particular intermediate frequency, thus avoiding the aforementioned difficulties.

More particularly, the invention is a laser radar system comprising a hybrid transmitter, a local oscillator, and means for sweeping the frequency of the continuous beam of the hybrid laser through its operating frequency range. Means is provided for mixing the continuous transmitter laser beam with the output signal of the local oscillator and for providing a difference frequency signal. Further means determines the instant when the transmitter frequency is offset from the local oscillator frequency by a predetermined frequency. At this instant the high pressure section of the hybrid transmitter laser is energized to produce a high powered laser pulse at approximately the same frequency as the low power continuous beam.

The reflected received echo signal from a fixed target is at the same frequency as the transmitted pulse and can therefore be mixed with the local oscillator signal in a detector to produce a pulse at the predetermined intermediate frequency. The reflected received echo signal from a moving target is shifted from the transmitter frequency by the Doppler frequency. When mixed with the local oscillator signal in a detector, a difference frequency is produced which is different from the intermediate frequency by the Doppler frequency.

BRIEF DESCRIPTION OF THE DRAWINGS

A better understanding of the invention will be obtained by reference to the figures listed below, and to the following description, in which.

DESCRIPTION OF THE PREFERRED EMBODIMENTS

Figure 1:
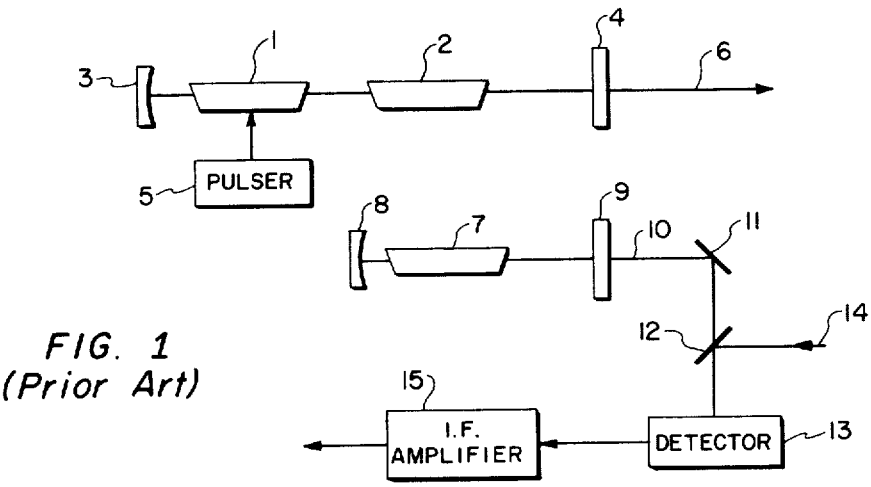
FIG. 1 is a block schematic of the prior art system.

Turning first to FIG. 1, a block schematic is shown of a system for providing a laser radar according to the prior art. In this system, operation of a transmitting laser is obtained in a single longitudinal mode, at a frequency which is approximately equal to that of a local oscillator. The transmitter is comprised of a high power pulsed laser section 1 which is in series with a low power amplifying and continuously oscillating laser section 2, both having a common coaxial optical cavity. Reflecting diffraction grating 3 and partially transmitting mirror 4 form the ends of the cavity. The low powered section 2 has a relatively narrow amplifying bandwidth which is equal to or less than the frequency spacing between the longitudinal modes of the optical cavity. Therefore when the high powered section is pulsed by means of pulser 5, oscillation is built up at some frequency within this bandwidth. An output laser beam 6 passes through the partially transmitting mirror 4 and is aimed at a target. This type of laser is sometimes called a hybrid laser and operates on a Single Longitudinal Mode (SLM) of the cavity.

A local oscillator laser is provided which has a discharge section 7 similar to the low powered laser section 2 and has reflective diffraction grating 8 and partially transmitting mirror 9 forming the bounds of its cavity. Accordingly, it oscillates within the same bandwidth as the transmitting laser. It should be noted that the frequency difference between the transmitter and the local oscillator cannot exceed the operating bandwidth of both the transmitter and the local oscillator (or one half the bandwidth if the local oscillator is stabilized to oscillate at the center of its operating bandwidth).

The local oscillator output laser beam 10 is reflected by a flat mirror 11 and passes through beamsplitter 12 into a detector 13. A portion of the reflected laser beam 6 returns as echo laser beam 14 and is reflected by a beamsplitter 12 so as to pass into detector 13 with the local oscillator laser beam 10.

Both the local oscillator laser beam and the echo laser beam are mixed in detector 13. The resulting difference frequency signal is applied to an intermediate frequency compute the range of the target, based on the time delay of the received echo from the transmitted pulse. The bandwidth of the intermediate frequency amplifier is normally designed to be equal to the bandwidth of the low power section of the transmitting laser or of the local oscillator laser plus the maximum expected Doppler shift.

The frequency of oscillation of the transmitting laser and of the local oscillator laser vary in an unsystematic manner due to changes in their optical lengths for the reasons noted earlier (i.e., vibration, refractive index changes, mechanical shock, etc.). The variation in frequency usually is large, for instance-tens to hundreds of megahertz, so as to extend to the band edges of the laser operating bandwidth. The difference frequency between echo signals and the local oscillator can, as a result, vary between 0 and the full operating bandwidth of either laser.

A number of unsatisfactory results are observed as a result of this variation in difference frequency. For instance, if the difference frequency is less than the reciprocal of the transmitter pulse duration, a complete cycle at the intermediate frequency cannot be formed and the echo may not be detected. Even if the echo is detected, range accuracy is poor because the pulse envelope is not reproduced. The intermediate frequency bandwidth cannot be matched to the reciprocal of the transmitter pulse duration for the optimum signal to noise ratio but must be much wider to accommodate variations in the difference frequencies. Also the Doppler shift cannot be measured because the echo signal differs in frequency from the local oscillator frequency by an indeterminate amount.

Figure 2:
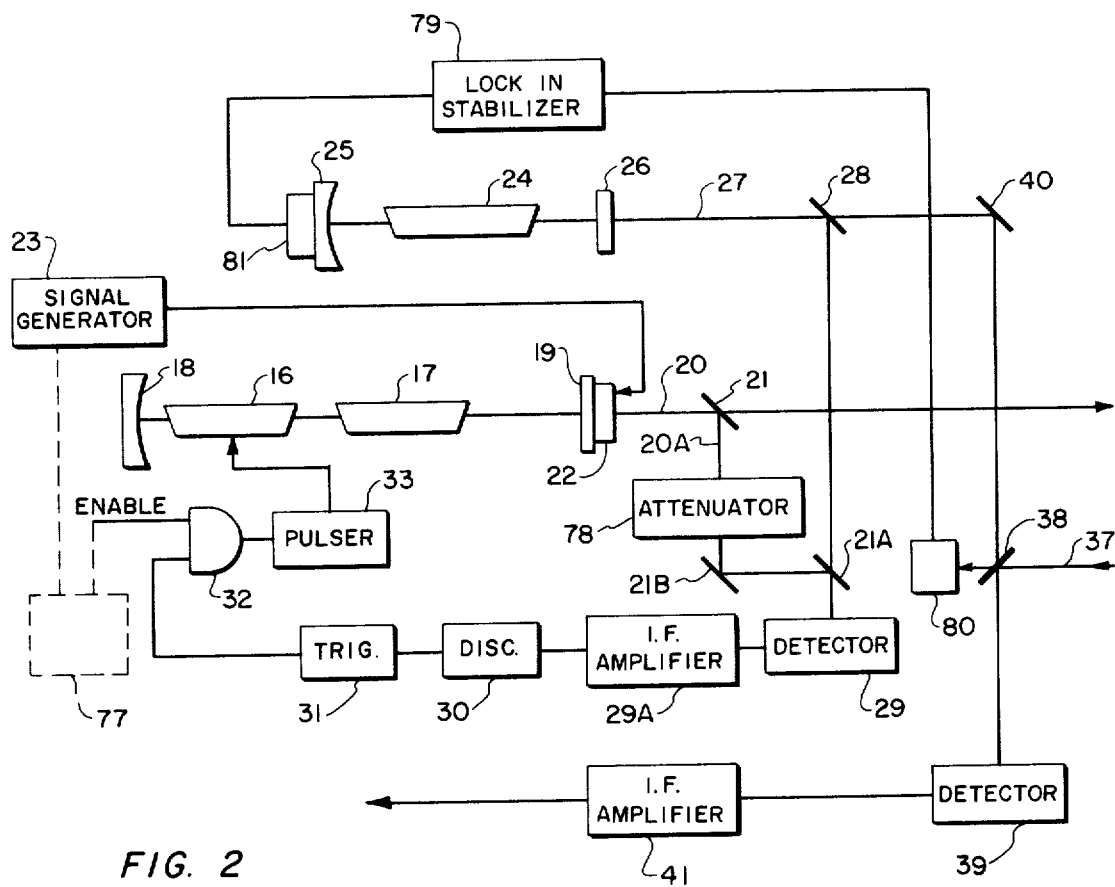
FIG. 2 is a block schematic of the present invention.

As shown in block diagram in FIG. 2, a hybrid laser of the present invention comprises a high-powered pulsed section 16 located in the same optical cavity as a low powered continuous laser section 17. The ends of the cavity are terminated by reflective diffraction granting 18 and partially transmitting mirror 19. A portion of the output laser beam 20 passes through mirror 19, through a beamsplitter 21 and is directed to a target.

Mirror 19 is mounted on an electromechanical transducer 22, such as a piezoelectric element which has its input connected to the output of signal generator 23. Upon operation of the signal generator, electromechanical transducer 22 vibrates according to the signal applied thereto, causing mirror 19 to vibrate, changing the optical length of the laser cavity, and thus varying its frequency.

A local oscillator laser comprising discharge section 24, reflective diffraction grating 25, and partially transmitting mirror 26 operates at a frequency similar to the continuous wave low powered laser. Its output laser beam 27 is reflected by beamsplitter 28, through beamsplitter 21A into a detector 29.

A portion of the beam 20, hereafter referenced as beam 20A, is reflected from beamsplitter 21 through attenuator 78 and from mirror 21B and beamsplitter 21A to detector 29. The laser beam signals 20A and 27 are mixed in detector 29 and the difference frequency is applied through an intermediate frequency amplifier 29A to a discriminator 30. The attenuator 78 is required to reduce the power level of beam 20A below the damage threshold of detector 29. The output signal of the discriminator is applied to a trigger circuit 31, its own output being connected to one input of AND gate 32. The other input of AND gate 32 is connected to a source of enable pulses.

While it should be understood that the hybrid laser is comprised of laser sections 16 and 17 and reflecting elements 18 and 19, which oscillates in a low power continuous mode, or produces high powered output pulses at approximately the same frequency when section 16 is pulsed, for ease of description the continuous mode laser will be referred to as laser 17, and the pulsed laser as laser 16. Similarly, the continuous laser comprising section 24 with reflecting elements 25 and 26 will be referred to as laser 24.

The output of AND gate 32 is connected to a pulser circuit 33, which is adapted to cause the high pressure laser 16 to emit a high powered pulse at approximately the frequency of the low powered laser.

It is preferred that the trigger circuit 31 should operate once an input threshold has been exceeded, either in the positive or negative direction. Accordingly, the trigger circuit preferably has a D.C. threshold control or predetermined level, which will become clear in the following description.

A return signal detector 80 has its output connected to a lock-in stabilizer 79. A piezoelectric transducer 81 is mounted on reflecting element 25, and has its input connected to the output of the lock-in stabilizer. The lock-in stabilizer suitable for the invention is available from Lansing Research Corporation, as model 80.214.

Figure 4:
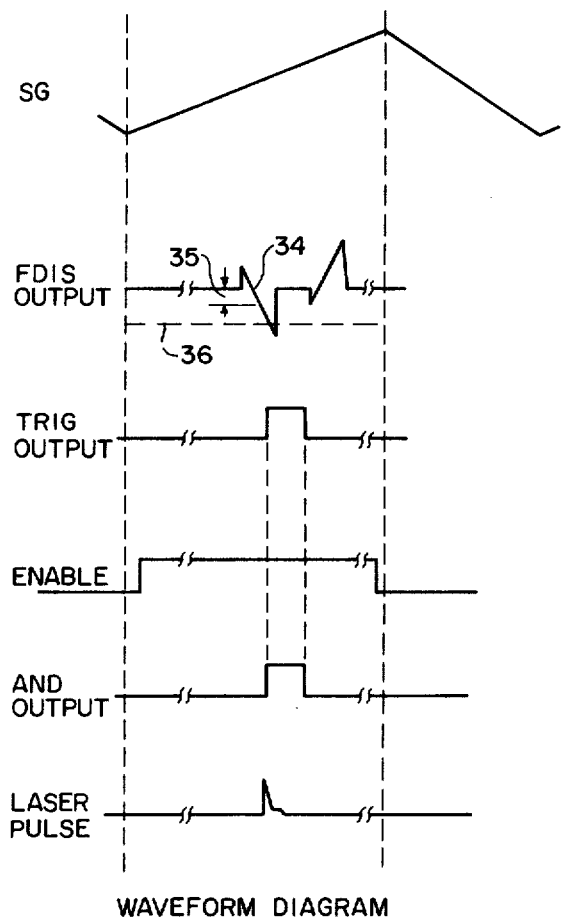
FIG. 4 is a diagram showing signal waveforms at various points in the circuit.

For an understanding of the operation of the circuit, reference is made to FIG. 4 in conjunction with FIG. 2. The signal generator 23 provides an output signal of triangular form, as shown in the waveform SG of FIG. 4. The transducer 22 thus causes the mirror 19 to modify its position according to the triangular slope which, it should be noted, is preferably linear in form.

As a result of the linear variation of the cavity length of the transmitting laser, the continuous wave signal generated in the low powered section 17 varies in frequency through the full range of the operating bandwidth. In addition, random variation of the resulting frequency, is encountered as was described earlier. The continuous wave low powered output signal thus varies randomly, but cycles through its operating bandwidth approximately once every time the cavity length changes by half a wavelength.

The local oscillator laser 24, being of similar structure as low powered laser 17, provides an output signal which must have a limited amount of frequency stabilization. Lock-in stabilizer 79 maintains the output frequency sufficiently close to the center of the laser's operating bandwidth for the purposes of the invention. Detector 80 monitors the power of laser beam 27 and through stabilizer 79 causes piezoelectric transducer 81 to tune the length of the optical cavity formed by elements 25 and 26. The laser beam 27 input to detector 80 can be obtained from the reflection of laser beam 27 from beamsplitter 38. The output laser beam 27 of the local oscillator is reflected in beamsplitter 28 and passes through partly reflective mirror 21A, which also reflects, along the same axis, the low powered continuous wave output of laser 17.

Both laser beams 27 and 20A are received by detector 29. Without the aforenoted variations, the frequency difference would remain constant. However, due to the random variation between the frequencies of laser 24 and laser 17, the frequency difference is not predictable.

However, in the present invention the frequency of continuous wave laser 17 is swept cyclically from one end of its bandwidth to the other, and it clearly will sweep through the frequency of the local oscillator about once every half wavelength excursion of the laser cavity length, although the particular time of coincidence is not predictable due to its additional random variations and the random variation of local oscillator 24.

The difference frequency signal between the two aforenoted signals is applied from detector 29 through intermediate frequency amplifier 29A to discriminator 30, which provides an output signal having amplitude depending on the difference between the discriminator center frequency and the difference frequency applied to it. The output of the discriminator is also dependent upon whether the frequency applied to it is sweep increasing or decreasing.

The frequency discriminator waveform FDIS output in FIG. 4 shows two distinct cycles, the left-hand cycle showing an output signal of the frequency discriminator as the difference frequency between the local oscillator and the low powered continuous wave laser decreases and the right-hand cycle shows the output of the frequency discriminator as the difference frequency increases.

Due to the unsymmetrical nature of the frequency discriminator outputs, it should be noted that a triggering level 36 can be established which cuts in a given direction (i.e. positive going or negative going) of the discriminator output once per waveform shown. Once the output signal of the frequency discriminator passes through this triggering level, the trigger 31 generates an output pulse. An input to trigger 31 provides the predetermined threshold point.

The third waveform TRIG output in FIG. 4 depicts an output pulse which occurs once the threshold has been exceeded (negatively, in the example shown). This is applied to AND gate 32.

A long ENABLE pulse (FIG. 4) is also applied to AND gate 32, which pulse begins at a time preceding the TRIG output pulse. As a result an AND output signal is applied to pulser 33. The pulser 33 causes the high powered laser 16 to output a high powered laser pulse which is reflected from the target. This pulse occurs about a microsecond after the time that the triggering threshold is exceeded (this short delay period not shown in FIG. 4).

The triggering level 36 is adjusted so that the TRIG pulse leading edge causes pulsing of the high powered laser when the difference frequency between the local oscillator and the main laser is close to the intermediate frequency (for example 10 MHz).

The return echo signal 37 from the target is reflected from beamsplitter 38 and is received by detector 39. The local oscillator output laser beam, having passed through beamsplitter 28 is reflected by mirror 40 and passes through beamsplitter 38 into detector 39. Here the two signals are mixed, and a difference frequency output signal is provided. This output signal is applied to an intermediate frequency amplifier 41. The center band frequency of the intermediate amplifier 41 is preset at the aforenoted intermediate frequency (10 MHz frequency in the example).

ENABLE pulses are provided at whatever pulse repetition rate is required for the ladar system. Transmitter pulses are produced only when ENABLE pulses are present. The rise rate of the triangular voltage is sufficiently rapid that the rate of change of frequency of the low pressure section in the hybrid laser exceeds the rate of variation of frequency due to the other causes which have been mentioned. Also, since echo signals are normally received within about 200 microseconds, the frequency of the stabilized local oscillator is substantially the same as it was when the high power pulse was transmitted, allowing accurate measurement of target velocity by measurement of Doppler shift.

It is preferred that AND gate 32 be designed such that should the leading edge of trigger output occur before the leading edge of the enable pulse, no high powered laser output signal is generated. A circuit for providing this function, as an example only will be described in more detail below, with reference to the detailed schematic of FIG. 3.

Figure 3:
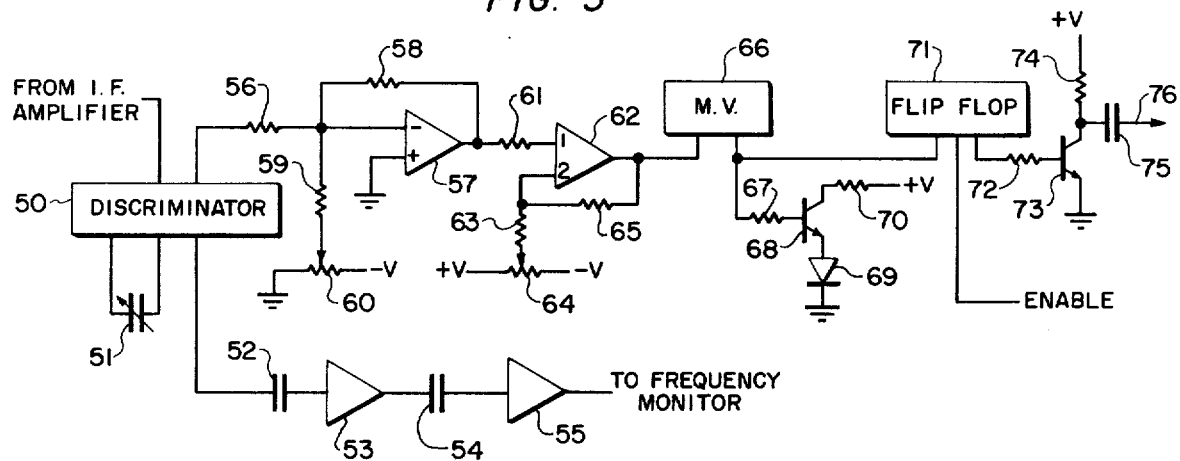
FIG. 3 is a detailed schematic of a portion of the block schematic of FIG. 2.

Turning now to FIG. 3, the input signal from the intermediate frequency is applied to a discriminator intergrated circuit 50; a variable capacitor 51 connected to the discriminator 50 establishes and adjusts its center frequency. The discriminator circuit used in a successful prototype of the invention was Signetics Corporation type NE 560 B. Peripheral passive components connected thereto are not shown as they are described in literature provided by the manufacturer and are details which can easily be determined to a person skilled in the art.

Connected to output pin 5 of the aforenoted integrated circuit, through a capacitor 52, is a buffer amplifier 53, which itself is connected through an isolating capacitor 54 to buffer amplifier 55. The output of buffer amplifier 55 is available to be connected to a frequency monitor, to permit monitoring of the frequency at which the frequency discriminator output is 0.

In the aforenoted prototype, buffer amplifier 53 was integrated circuit NE 501 A and amplifier 55 was integrated circuit type LH0002.

The output of discriminator 50, at pin 9 of the aforenoted integrated circuit is connected through resistor 56 to the inverting input of operational amplifier 57. This amplifier has a conventional feedback resistor 58 connected between its output and its inverting input. The non-inverting input of the amplifier is connected to ground.

The discriminator output was found to have a D.C. offset, which is corrected by the inverting input of operational amplifier 57 being connected through resistor 59 to the tap of a potentiometer 60, which is connected between a source of negative potential and ground. Adjustment of the potentiometer 60 adjusts the offset to 0 in conjunction with amplifier 57.

The zero crossing frequency of the frequency discriminator 50 is preferably adjusted by variable capacitor 51 and in the prototype was set to approximately 10 MHz. The passband of the intermediate frequency amplifier 29A was about 3 to 4 MHz centered at 10 MHz.

The output of operational amplifier 57 is connected through input resistor 61 to input 1 of comparator 62. Input 2 is connected through a resistor 63 to the tap of a potentiometer 64, which itself is connected between a source of positive voltage +V and negative voltage −V. A feedback resistor 65 connects output 2 of comparator 62 to input 2 to establish hysteresis for noise immunity.

The output of comparator 62 is connected to the input of a monstable multivibrator 66. In the prototype the multivibrator was integratd circuit type SN 74121; the output of comparator 62 was connected to pin 5 thereof.

The output of monostable multivibrator 66, which is at pin 6 of the aforenoted integrated circuit is connected to an AND circuit as will be described below.

The output is also connected through an input resistor 67 to the base of a light emitting diode driver transistor 68. The transistor shown is of NPN type, and has its emitter connected through a light emitting diode 69 to ground, and its collector, connected through resistor 70 to a source of potential +V.

The output of monostable multivibrator 66, as noted earlier, is connected to an AND circuit comprising flip flop 71. In the prototype noted earlier, the flip flop was integrated circuit type SN 7474, which has its PRESET input at pin 4 and its CLOCK input at pin 3. The input from the multivibrator 66 is connected to the CLOCK input of the flip flop and the ENABLE signal is applied to the PRESET input.

The output of flip flop 71 is connected (at pin 5 of the flip flop specified) through input resistor 72 to the base of an amplifier transistor 73. With the transistor 73 shown being of NPN type, its emitter is connected to ground and its collector is connected to a source of potential +V through resistor 74. The output signal to be applied to the high powered laser pulser is connected through capacitor 75 to output lead 76.

In operation, with reference to the waveforms of FIG. 4, the intermediate frequency signal from the detector is applied to discriminator 50. As noted earlier this signal is at the difference frequency between local oscillator 24 and the frequency of the low powered laser 17. As the frequency of the low powered laser 17 is swept through its bandwidth by the variation of its cavity length caused by displacement of reflective mirror 19, its frequency sweeps through the frequency of the local oscillator. Accordingly, at least at one particular instant the frequencies are the same.

However, the zero crossing frequency of discriminator 50 is set by adjustment of variable capacitor 51 at, for example, approximately 10 MHz. As the frequency of the low powered laser sweeps downward toward the exact frequency of the local oscillator, which is maintained near the center of its operating bandwidth as aforementioned, it passes through the 10 MHz difference point as it approaches; it also has a difference frequency of 10 MHz as the frequency difference increases again as the low powered laser further decreases in frequency to its lowest within the allowable bandwidth. Accordingly, the discriminator 50 provides two output waveforms. The first waveform, shown as a positive-going then negative-going left-hand portion in the FDIS output waveform of FIG. 4, as the frequency of the low powered laser drops toward the same frequency as the local oscillator. As it drops lower than the frequency of the local oscillator, a second waveform is produced which is shown to the right of the aforenoted one, first dropping negatively from zero then rising positively and finally dropping again to zero. This is the form of the waveform which is applied to input resistor 56 of operational amplifier 57.

The zero crossing frequency of the discriminator can be measured at the output of buffer amplifier 55, to aid the proper adjustment of variable capacitor 51.

The laser cavity for low powered laser 17 is varied, as was described earlier, by the signal output of signal generator 23. In the prototype, the output sweep waveform is triangular, as shown in the top waveform SG in FIG. 4, the ramp time being about 20 milliseconds.

As there exists a D.C. offset voltage at the output of discriminator 50, this D.C. offset voltage is adjusted to zero by variation of the tap of potentiometer 60.

The output signal of amplifier 57, which in the prototype was a type uT 741 integrated circuit amplifier, is applied to the input of comparator 62. This comparator was a type uA 760 integrated circuit in the prototype. When the voltage at its input 1 drops below the voltage at its input 2, the output signal switches positively. This low to high level transition is applied to monostable multivibrator 66, which produces at its output a positive output pulse, in the example shown, of about 7 milliseconds long. This output pulse can be observed by a blink of light emitting diode 69.

The threshold of the trigger circuit is set by variation of the tap of potentiometer 64. This threshold can be seen as the horizontal dashed line 36 of the waveform FDIS output of FIG. 4. It can be seen from the waveform that as the output signal of the frequency discriminator passes through the threshold, a triggered output pulse shown as waveform TRIG output is produced from multivibrator 66. This signal is applied to the input of the flip flop 71 which is used as an AND gate.

An enable pulse shown as the ENABLE waveform in FIG. 4 is applied to the PRESET input of flip flop 71. An output pulse of flip flop 71 is produced in the event the enable pulse is applied to flip flop 71 and exists during the low to high transistion of the trigger input. If the enable signal arrives after the leading edge of the trigger pulse, no output is produced from flip flop 71. An output then occurs at the next low to high transition of the trigger circuit. This circuit arrangement assures that the leading edge of the output pulse from the AND circuit is coincident with the leading edge of the pulse from the trigger circuit and does not occur during the trigger pulse when the input frequency from the detector may no longer be the desired one.

The output of flip flop 71 is the AND output waveform shown in FIG. 4. This is applied through transistor 73 to the pulser 33 of FIG. 2, and causes a high powered laser pulse to be produced, as shown as the laser pulse waveform in FIG. 4. For the case of the low power laser cavity being swept to decrease its frequency, this pulse clearly occurs at the time when the low powered laser frequency is higher than the local oscillator by slightly less than 10 MHz for a discriminator centre frequency of 10 MHz set with variable capacitor 51.

In the circuit shown, the trigger threshold is at a more negative point that the average (or zero) frequency discriminator output, and is exceeded in a negative direction as the frequency of the low powered laser is decreasing but still is higher than that of the local oscillator. Alternatively, the threshold could have been set at a positive amplitude above the zero voltage output level of the discriminator, to allow a pulse to occur after the frequency of the low powered laser has dropped below that of the local oscillator when the frequency difference between the low power laser and local oscillator laser is increasing.

By enabling the AND circuit at the repetition rate of the laser for the period synchronized to the ramp rise (or fall) of the signal generator it can be assured that the low power laser frequency is decreasing as in the aforementioned example (or increasing) in the enabled period. The ramp rise must be sufficiently high to overcome the random change in the laser frequency which is induced from other sources.

The trigger circuit output signal is initiated when the frequency discriminator output signal passes through the trigger threshold, and provided there is an enable signal, initiates the output signal from the AND circuit. The leading edge of this output pulse is applied to pulser 33 which causes the laser high voltage capacitor (not shown) to be discharged into the laser.

As previously explained, movement of the transducer 22 causes the difference frequency to be swept through the discriminator characteristic. In practice the frequency sweep of the low power laser 17 may be greater than required and more than one cavity mode could sweep through the laser's operating bandwidth. Therefore the characteristic output of the discriminator could be traced two or three times in the course of a single signal generator ramp rise. The first time the characteristic is traced in the correct direction to operate the trigger-circuit, the laser is pulsed. A second tracing of the characteristic in the correct direction would not cause a laser to be pulsed since the laser high voltage capacitor would not have had time to recharge after the first pulse. In a high repetition rate system other means known to persons skilled in the art can be employed to prevent the second pulse.

A synchronization circuit 77 can be designed to provide an enable output signal which is applied to AND circuit 32 (see FIG. 2) and also to trigger signal generator 23 in synchronization therewith. This assures the triggering of a high energy laser pulse from high power laser 16 once per ramp cycle of signal generator 23. Accordingly, there is synchronization of the frequency sweeping and production of a single high powered pulse.

In the prototype system described, the wavelength of the low powered laser 17 was 10.6 microns, the laser being of carbon dioxide type. The cavity length of the hybrid laser was about three meters, which allows a possible frequency range of oscillation of 50 MHz for a cavity mode. The maximum difference frequency between the low pressure laser and the local oscillator would then be about 25 MHz if the local oscillator was at the center of its operating bandwidth.

It has been found that this system provides substantially improved frequency stability of the intermediate frequency signal.

A person skilled in the art understanding this invention may now conceive of variations or improvements. All are considered within the sphere and scope of this invention as defined in the appended claims.

What is claimed is:

1. A laser radar system comprising a hybrid transmitter laser including a high power pulse section and a low power continuous section within a common optical cavity, a local oscillator laser, means for mixing a continuous output beam of a given frequency from the transmitter laser with the output signal frequency of the local oscillator and for providing a difference signal frequency, means for determining the instant when the transmitter frequency is offset from the local oscillator by a predetermined value, and means for causing a high powered output signal pulse to be generated by the transmitter laser at said instant and at the same frequency as said low power output.

2. A laser radar system comprising:
(a) a hybrid transmitter laser for generating a low power output signal, said transmitter laser including a high power pulse section and a low power continuous section within a common optical cavity,
(b) pulsing means for causing the transmitter laser to generate a high powered output signal upon receipt of an input signal pulse,
(c) means for frequency modulating the low power output signal to sweep through a predetermined operating frequency range,
(d) a local oscillator laser providing a signal frequency,
(e) means for mixing said signal from the local oscillator with the low power output signal to provide a varying difference frequency,
(f) a frequency discriminator means for receiving said difference frequency and providing a discriminator output signal having a predetermined center frequency which is different from the local oscillator frequency when the output signal frequency is being swept higher or lower than the local oscillator frequency, and
(g) means enabled by the discriminator at a predetermined amplitude of discriminator output signal for operating the pulsing means to cause a high powered output signal to be generated by the transmitter laser at approximately the same frequency as the low power output signal.

3. A laser radar system as defined in claim 2, further including threshold means for establishing said predetermined amplitude of discriminator output signal and for generating an output pulse upon the discriminator output signal exceeding said predetermined amplitude.

4. A laser radar system as defined in claim 3, further including means for mixing the local oscillator signal with a received signal reflected from a radar target to provide an intermediate frequency signal, said predetermined amplitude being established at a discriminator frequency which is approximately the same as the intermediate frequency, whereby a high powered laser output pulse is caused to be generated when both (i) the difference between the local oscillator and the low power output signal is at the intermediate frequency, and (ii) the local oscillator frequency is a predetermined frequency differing from the low power output frequency.

5. A laser radar system as defined in claim 2 in which the means for frequency modulating is comprised of means for progressively varying the length of the hybrid laser cavity.

6. A laser radar system as defined in claim 4, in which the local oscillator is comprised of a second laser operating at a frequency which is different from the frequency of the low power output signal by approximately the intermediate frequency.

7. A laser radar system as defined in claim 6, in which the cavity of the transmitter laser includes at least one mirror, and in which the means for modulating is comprised of an electromechanical transducer on which the mirror is mounted, and further including means for linearly vibrating the mirror by applying a signal to the transducer to change the cavity length and sweep the frequency of the low power output signal from a high frequency to a low frequency and from a low frequency to a high frequency through the local oscillator frequency as the cavity length is varied.

8. A laser radar system comprising:
(a) a hybrid transmitter laser for generating a low power continuous output signal, said transmitter laser including a high power pulse section and a low power continuous section within a common optical cavity, said cavity including at least one mirror for reflecting the signal, (b) pulsing means for causing the transmitter laser to generate a high powered output pulse upon receipt of an input pulse signal, (c) an electromagnetic transducer on which said one mirror is mounted, (d) a signal generator connected to the transducer, (e) a second laser operating at a local oscillator frequency, (f) means for mixing a signal from the second laser at the local oscillator frequency with said output signal of the hybrid laser to provide a varying difference frequency, (g) a frequency discriminator connected to the means for mixing to receive the difference frequency and to provide an output signal having a center frequency different from said local oscillator frequency and an amplitude dependent on (i) the difference between the difference frequency and said center frequency, and (ii) the change in direction of the difference frequency, (h) a triggering circuit connected to the output of the frequency discriminator for providing an output pulse when the output signal of the frequency discriminator has exceeded a predetermined threshold of predetermined polarity, (i) a source of an enable pulse signal, and (j) an AND circuit having an input connected to the output of the triggering circuit and to said source of an enable pulse signal and having an output connected to the pulsing means to cause said hybrid laser to generate a high power output pulse upon receipt of an enable pulse and a trigger pulse from the output signal of the discriminator exceeding said threshold.

9. A laser radar as defined in claim 8, further including means for receiving a reflected signal of the high powered output pulse and mixing it with the local oscillator frequency signal to provide an intermediate frequency signal, the predetermined threshold being such as to occur at a discriminator frequency which is at approximately the intermediate frequency.

10. A laser radar as defined in claim 9, including means for providing a D.C. threshold potential to the input of the triggering circuit.

11. A laser radar as defined in claim 10 in which the D.C. threshold potential is negatively biased, including means for setting the predetermined threshold at a potential more negative than the average discriminator output potential.

12. A laser radar as defined in claim 10, in which the D.C. offset potential is positively biased, including means for setting the predetermined threshold at a potential more positive than the average discriminator output potential.

* * * * *